(12) United States Patent
Ohtsuki et al.

(10) Patent No.: US 6,481,896 B1
(45) Date of Patent: Nov. 19, 2002

(54) SEALING DEVICE FOR A BEARING

(75) Inventors: Hisashi Ohtsuki, Iwata (JP); Shougo Suzuki, Iwata (JP); Eiji Tajima, Iwata (JP)

(73) Assignee: NTN Corporation, Osaka (JP)

( * ) Notice: Subject to any disclaimer, the term of this patent is extended or adjusted under 35 U.S.C. 154(b) by 46 days.

(21) Appl. No.: 09/638,019

(22) Filed: Aug. 14, 2000

(30) Foreign Application Priority Data

Aug. 31, 1999 (JP) ............................................. 11-245305
Oct. 5, 1999 (JP) ............................................. 11-284269

(51) Int. Cl.⁷ .............................. F16C 33/76; F16J 15/32
(52) U.S. Cl. ........................ 384/484; 277/351; 277/353; 277/571; 384/544; 384/486
(58) Field of Search .................................. 384/477, 484, 384/486, 544, 589; 277/351, 350, 353, 571, 565, 562

(56) References Cited

U.S. PATENT DOCUMENTS

| 3,583,511 A | * | 6/1971 | Asberg ........................ 384/544 |
| 4,252,329 A | * | 2/1981 | Messenger .................. 277/551 |
| 4,402,558 A | * | 9/1983 | Olschewski et al. ........ 384/469 |
| 4,408,809 A | * | 10/1983 | Walter et al. ................ 384/486 |
| 4,448,426 A | * | 5/1984 | Jackowski et al. .......... 277/353 |
| 5,890,812 A | * | 4/1999 | Marcello et al. ............ 384/148 |
| 5,997,005 A | * | 12/1999 | Gold et al. .................. 277/402 |
| 6,170,992 B1 | * | 1/2001 | Angelo et al. ............... 277/551 |
| 6,217,225 B1 | * | 4/2001 | Shimizu et al. ............. 384/486 |

* cited by examiner

Primary Examiner—Thomas R. Hannon
(74) Attorney, Agent, or Firm—Sughrue Mion, PLLC

(57) ABSTRACT

A sealing device for a bearing includes first and second annular sealing plates (1, 2) accommodated within an annular end space between inner and outer races (11, 12). Each of the first and second sealing plates (1, 2) is of a generally L-shaped section including a cylindrical (16, 26) wall and a radial upright wall (1a, 2a), and an elastic seal lip element (38). The first sealing plate (1) is secured with the radial upright wall (1a) thereof positioned adjacent respective end faces of the inner and outer races (11, 12), and the radial upright wall (1a) of the first sealing plate (1) has a free end remote from the cylindrical wall (1b) of the first sealing plate (1) spaced a predetermined distance from the cylindrical wall (2b) of the second sealing plate (2) to thereby form a radial gap (4). The radial upright wall (1a) of the first sealing plate (1) also has an outer side face (B) set back inwardly from a free end face (A) of the cylindrical wall (2b) of the second sealing plate (2).

5 Claims, 7 Drawing Sheets

SEALING DEVICE FOR A BEARING

BACKGROUND OF THE INVENTION

1. Field of the Invention

The present invention generally relates to a sealing device disposed between inner and outer races rotatable relative to each other such as, for example, between inner and outer races of a rolling bearing assembly or between inner and outer races that forms respectively a part of a rotary shaft and a part of a housing, for sealing an inner space between the outer and inner races from an external environment and, more particularly, to the sealing device for a bearing that utilizes a combination of a sealing plate such as a slinger and a sealing lip.

2. Description of the Prior Art

Hitherto, such a sealing device for an axle bearing as shown in FIG. 7 has been utilized. The sealing device 10 shown in FIG. 7 is used to seal an inner annular space between a fixed inner race and a rotatable outer race and includes an inner peripheral sealing plate 51 of a generally L-sectioned configuration and an outer peripheral sealing strip 52 of a generally L-sectioned configuration. The inner and outer peripheral sealing plates 51 and 52 are so arranged and so positioned relative to each other as to define a generally rectangular sectioned annular space therebetween. The illustrated sealing device 10 also includes an elastic strip 53 made of, for example, rubber and integrated together with the outer peripheral sealing plate 52. This elastic strip 53 has sealing lips such as a side seal lip 53a and radial seal lips 53b and 53c, all formed integrally therewith. These side seal lip 53a and the radial seal lips 53b and 53c are held in contact with a radial upright wall 51a and a cylindrical wall 51b, respectively, both forming respective parts of the inner peripheral sealing plate 51. The radial upright wall 51a of the inner peripheral sealing plate 51 extends radially outwardly from the cylindrical wall 51b so as to terminate spaced a slight distance inwardly from a cylindrical wall 52b of the outer peripheral sealing plate 52 to define a labyrinth seal 54 between the radial upright wall 51a and the cylindrical wall 52b. An outer annular surface C of the radial upright wall 51 a of the inner peripheral sealing plate 51 is held in flush with an annular end face A of the elastic strip 53 on the cylindrical wall 52b of the outer peripheral sealing plate 52. It is, however, to be noted that the annular end face A is in practice represented by an annular outer end face of a portion of the elastic strip 53 that is turned around a corresponding end of the cylindrical wall 52b of the outer peripheral sealing plate 52.

On the other hand, as shown in FIG. 8, the conventional axle bearing 200 including a rotatable inner race structure and a fixed outer race structure has been known, which includes an outer race 34 having an outer peripheral surface formed integrally with a radial flange through which the axle bearing 200 is fitted to an automobile body structure, and also having an inner peripheral surface formed with dual raceways 33 and 33; an inner race assembly including inboard and outboard inner races 36 and 36 having respective raceways 35 and 35 defined therein in face-to-face relation with the dual raceways 33 and 33 in the outer race 34; respective rows of rolling elements 37 and 37 rollingly accommodated between the raceways 33 and 33 in the outer race 34 and the raceways 35 and 35 in the inboard and outboard inner races 36 and 36; and inboard and outboard sealing devices 30B and 30C for sealing an annular space delimited between the outer race 34 and the inboard and outboard inner races 36 and 36.

The rolling elements 37 are retained by a retainer 39 with a predetermined circumferential space between the neighboring rolling elements 37.

To reduce the weight of the axle bearing 200, the width of the outer race 34 as measured in a direction axially of the axle bearing 200 is chosen to be smaller than the width of the inner race assembly, that is, the total width of the paired inner races 36 and 36 also as measured in a direction axially of the axle bearing 200. The outer race 34 and the inner race assembly are so positioned relative to each other that an annular end face of the outer race 34 on an outboard side is held in flush with an annular end face of the outboard inner race 36, but the opposite annular end face of the outer race 34 on an inboard side is set back axially inwardly from an annular end face of the inboard inner race 36.

The inboard sealing device 30B includes a sealing plate 63A, which serves as a core, and a seal lip member 38 formed integrally therewith. The sealing plate 63A is mounted on a shoulder at an inner end of the outer race 34. The seal lip member 38 has an inner peripheral edge formed with bifurcated radial lips 38b and 38c that are slidingly engaged with an outer peripheral surface of an inboard end of the inboard inner race 36. The outboard sealing device 30c includes a sealing plate 63B, which serves as a core, and a seal lip member 38 formed integrally therewith. The sealing plate 63B is mounted to an inner periphery of the outer race 34. The seal lip member 38 of the outboard sealing device 30c has an inner peripheral edge formed with bifurcated radial lips 38b and 38c that are slidingly engaged with an outer peripheral surface of an outboard end of the outboard inner race 36. The radial flange 32 integral with the outer race 34 is formed with a bolt hole 44 defined therein for passage therethrough of a corresponding bolt used to secure the axle bearing 200 to a knuckle carried by the automobile body.

To further reduce the weight of the axle bearing 200, as shown in FIG. 9, in a manner similar to the opposite annular end face of the outer race 34 on an inboard side, the outboard annular end face of the outer race 34 can be set back axially inwardly from the outboard annular end face of the outboard inner race 36. In such case, the inboard and outboard sealing devices 30B and 30C may have a structure identical with each other.

In the prior art sealing device 10 shown in FIG. 7, the annular end face A of the cylindrical wall 52b of the outer peripheral sealing plate 52 and the outer annular surface C of the radial upright wall 51a of the inner peripheral sealing plate 51 are held in flush with each other in respect of the datum, that is, as a theoretically accurate geometric reference. Considering a step occurring in an actual produce between the annular end face A and the outer annular surface C, and also considering a design tolerance and a possible variation which would occur during assembly in view of the plate thickness of each of the sealing plates 51 and 52, the worst case it may occur would be that the outer annular end face C will protrude a distance outwardly, i.e., rightwards as viewed in FIG. 7, from the plane of the annular end face A.

The prior art sealing device 10 makes use of a labyrinth seal 54 as a means for avoiding ingress of muddy water in cooperation with the three seal lips 53a, 53b and 53c. This labyrinth seal 54 is formed between a free end face a of the radial upright wall 51a of the inner peripheral sealing plate 51 and an inner peripheral face b of the cylindrical wall 52b of the outer peripheral sealing plate 52.

However, if the outer annular end face C protrudes outwardly from the annular end face A as discussed hereinabove, the width of the labyrinth seal 54 as measured in a direction axially of the sealing device will decrease, accompanied by reduction in the capability of the labyrinth seal 54 to avoid the ingress of muddy water.

In the prior axle bearing 200 of the structure shown in FIG. 8 or FIG. 9, the outer peripheral surface of the inboard end of the inboard inner race 36, with which the bifurcated radial lips 38b and 38c of the seal lip member 38 are slidingly engaged, are exposed to the outside and is therefore easily contaminated by splashes of muddy water and dusts. For this reason, the outer peripheral surface of the inboard end of the inboard inner race 36, with which the bifurcated radial lips 38b and 38c of the seal lip member 38 are slidingly engaged, is susceptible to rusting. This is problematic in that once the outer peripheral surface of the inboard end of the inboard inner race 36 rusts, debris of rust detaching from such outer peripheral surface will accelerate wear of the bifurcated radial lips 38b and 38c, resulting in premature reduction in sealing performance.

SUMMARY OF THE INVENTION

In view of the foregoing, the present invention has for its essential object to provide an improved sealing device effective to make best use of a labyrinth seal to thereby increase the sealing performance.

To this end, the sealing device for a bearing according to one aspect of the present invention includes first and second annular sealing plates accommodated within an annular end space between inner and outer races, one of said first and second annular sealing plates being secured to one of the inner and outer races while the other of said first and second annular sealing plates is secured to the other of the inner and outer races, each of said first and second sealing plates being of a generally L-shaped section including a cylindrical wall and a radial upright wall, and an elastic seal lip element. The first sealing plate is secured with the radial upright wall thereof positioned adjacent respective end faces of the inner and outer races, and the radial upright wall of the first sealing plate has a free end remote from the cylindrical wall of the first sealing plate spaced a predetermined distance from the cylindrical wall of the second sealing plate to thereby form a radial gap. The radial upright wall of the first sealing plate also has an outer side face set back inwardly from a free end face of the cylindrical wall of the second sealing plate.

The amount of this set-back is so determined and so set that even in the presence of an error occurring during the manufacture or assemblage within the design tolerance, the set-back of the radial upright wall of the first sealing plate can necessarily occur. In other words, the amount of the set-back of the radial upright wall is chosen to be greater than the possible error which would occur during the manufacture or assemblage.

According to the above described structure, the labyrinth seal is formed in the radial gap delimited between the free end of the radial upright wall of the first sealing plate and the cylindrical wall of the second sealing plate, and the sealing capability against any possible ingress of muddy water can be obtained by the action of the labyrinth seal and the contact of the seal lips. Since in this structure the outer side surface of the radial upright wall of the first sealing plate is set back inwardly from the free end face of the cylindrical wall of the second sealing plate, the effective labyrinth seal having a predetermined width as measured in an axial direction can be maintained at all times between the radial upright wall of the first sealing plate and the cylindrical wall of the second sealing plate, thereby enhancing the sealing capability. Also, since set-back of the radial upright wall of the first sealing plate is sufficient relative to the free end face of the cylindrical wall of the second sealing plate, no complicated and time-consuming shaping process need be applied to the sealing plates, allowing the sealing plates of a simplified shape to be employed. Also, with no need to increase the size of the annular space for installation of the sealing device, the sealing capability can be increased.

In a preferred embodiment of the present invention, the elastic seal lip element may be provided in the second sealing plate.

If desired, the elastic seal lip element may include a side lip held in sliding engagement with the radial upright wall of the first sealing plate and at least one radial lip held in sliding engagement with the cylindrical wall of the first sealing plate. Where the elastic seal lip element includes the side lip and the radial lips, the side and radial lips cooperate with the labyrinth seal to define a multiple seal to thereby increase the sealing performance. Also, the presence of the side lip and the radial lips is effective to allow the seal lip that extends in either an axial direction or a radial direction to secure the sealing capability even when the first and second sealing plates displace relative to each other not only in an axial direction but also in a radial direction.

In a preferred embodiment of the present invention, an engagement surface of the second sealing plate that is secured to one of the inner and outer races may have at least a free end portion vulcanized with rubber. This rubber is the one integrated with the elastic seal lip element.

If the rubber is provided on the free end portion of the cylindrical wall of the second sealing plate as described above, any possible ingress of muddy water through the cylindrical wall of the second sealing place can be suppressed to secure a sufficient sealing capacity. Also, since this rubber is vulcanized, fixing thereof to the second sealing plate can easily and assuredly be accomplished.

In a preferred embodiment of the present invention, the first sealing plate may be secured to an outer peripheral surface of the inner race, in which case the second sealing plate is secured to an inner peripheral surface of the outer race.

Where the first and second sealing plates are so disposed, the position where the labyrinth seal is formed lies in the outer diameter region in the annular end space between the inner and outer races and a relatively large centrifugal force acts to enhance the sealing performance and, therefore, even though muddy water enters a space within the sealing device and extending from the labyrinth seal to the seal lip element, it can easily be drained off by the effect of the centrifugal force.

The sealing device according to another aspect of the present invention is for use with an axle bearing comprising an outer race having a fitting flange for connecting to an automobile body and also having an inner peripheral surface formed with dual outer raceways defined therein, first and second inner races juxtaposed to each other and each having an outer peripheral surface formed with an inner raceway in face-to-face relation to a corresponding one of the outer raceways, and two rows of rolling elements. The rolling elements of each row are accommodated in between one of the outer raceways of the outer race and the inner raceway of one of the inner races. In this bearing, the outer race has a width as measured in a direction axially thereof which is smaller than the sum of respective width of the inner races as measured in a direction axially thereof. At least an inboard-side end face of the outer race is positioned at a location set back inwardly towards an annular space, which is delimited between the outer race and the juxtaposed inner races, from an end face of one of the inner races.

The sealing device for use in that particular bearing is operable to seal the annular space at each of opposite ends of the annular space and includes a first sealing plate of a generally L-shaped section mounted on an outer peripheral surface of at least one of the juxtaposed inner races and positioned at a location adjacent one end of the inner races and having a radial upright wall formed therein, a second sealing plate mounted in an outer peripheral surface of the outer race and positioned at a location adjacent the first sealing plate and including an elastic seal lip member fixed to the second sealing plate. The elastic seal lip member is held in sliding engagement with the first sealing plate and has a bulged portion formed therewith and positioned spaced a slight distance radially from the upright wall of the first sealing plate to define a labyrinth seal between the bulged portion and the first sealing plate.

According to the second-mentioned aspect of the present invention, since any possible ingress of muddy water towards the sliding surface of the elastic seal lip member can be prevented by the effective labyrinth seal defined between the first sealing plate and the elastic seal lip member, rusting of the sliding surface can be prevented to secure a high sealing performance.

Preferably, the first sealing plate is mounted on at least an inboard-side outer peripheral surface of each of the juxtaposed inner races and the elastic seal lip member of the sealing device on an inboard side of the outer race is held in sliding contact with such first sealing plate. This is effective to protect the sliding surface on the inboard side that is susceptible to muddy water.

The elastic seal lip member may include bifurcated radial lips slidingly engaged with a cylindrical wall of the first sealing plate and a side lip extending slantwise radially outwardly from the elastic seal lip member and slidingly engaged with the radial upright wall of the first sealing plate. This is particularly advantageous in that the sealing performance can further be increased.

In a preferred embodiment, the outer race has an outer peripheral surface formed with a knuckle engagement. The knuckle engagement has a generally intermediate portion formed with a reduced-diameter step and wherein the second sealing plate is mounted on the reduced-diameter step of the knuckle engagement. Also, the juxtaposed inner races may be mounted directly on an outer race stem portion of a constant velocity joint and wherein the juxtaposed inner races are sandwiched and positioned in between a hub wheel for support of a wheel and a shoulder of a joint outer race of the constant velocity joint.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
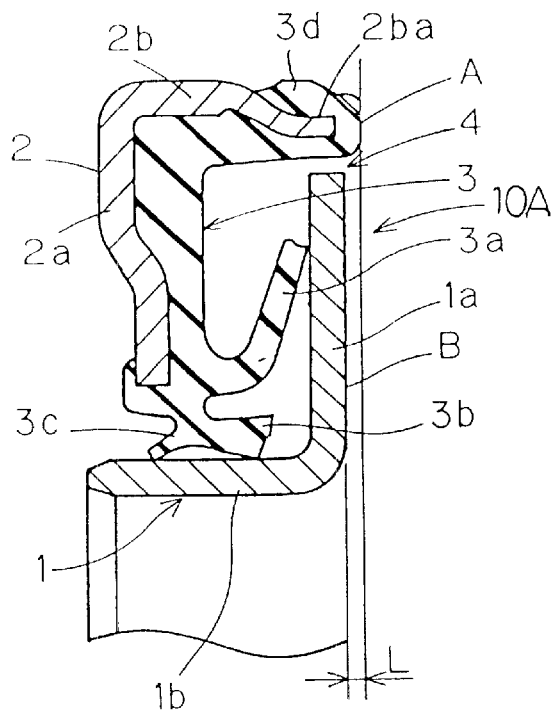
FIG. 1A is a transverse sectional view of a portion of a sealing device according to a first preferred embodiment of the present invention.
Figure 1B:
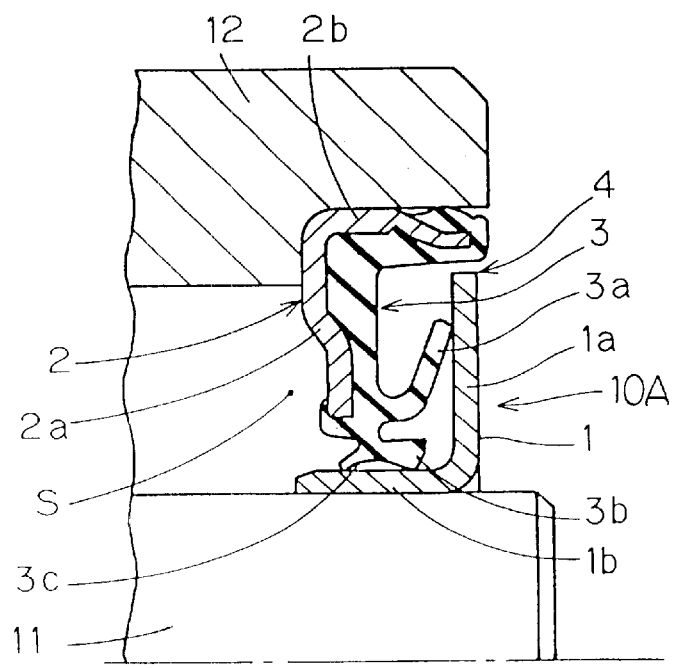
FIG. 1B is a transverse sectional view of that portion of the sealing device of FIG. 1A, showing the sealing device in a condition having been mounted in between outer and inner races.

Referring first to FIGS. 1A and 1B, a sealing device 10A according to a first preferred embodiment of the present invention will be described. The sealing device 10A shown therein is used to seal an annular space S delimited between respective ends of inner and outer races 11 and 12 rotatable relative to each other from an external environment and includes first and second annular sealing plates 1 and 2 of a generally L-sectioned configuration accommodated within an end portion of the annular space S, and an annular elastic strip 3 integrated with the second sealing plate 2. Each of the first and second sealing plates 1 and 2 includes a cylindrical wall 1b and 2b and a radial upright wall 1a and 2a, and these first and second sealing plates 1 and 2 are so arranged and so positioned relative to each other as to define the annular space S of a generally rectangular cross-section. The first sealing plate 1 is adapted to be press-fitted into an outer peripheral surface of the inner race 11, whereas the second sealing plate 2 is adapted to be press-fitted onto an inner peripheral surface of the outer race 12.

The first sealing plate 1 when mounted in between the inner and outer races 11 and 12 has its radial upright wall 1a positioned adjacent the respective ends of the inner and outer races 11 and 12 with a radial free end face of the radial upright wall 1a spaced a slight distance radially inwardly from an inner peripheral surface of the cylindrical wall 2b of the second sealing plate 2 to thereby define a labyrinth seal 4. An outer side surface B of the radial upright wall 1a of the first sealing plate 1 lies in a plane set back a distance L inwardly from a plane of an annular end face A of the cylindrical wall 2b of the second sealing plate 2. Where the cylindrical wall 2b of the second sealing plate 2 is covered by the elastic strip 3 as shown in accordance with the first embodiment of the present invention, the inner peripheral surface and the annular end face A of the cylindrical wall 2b of the second sealing plate 2 are to be understood as represented by those of a portion of the elastic strip 3 that is turned around a corresponding end of the cylindrical wall 2b of the second sealing plate 2. The set-back distance L of the radial upright wall is chosen to be greater than a possible error which would occur during the manufacture or assemblage so that the set-back is assured regardless of the presence or absence of the error occurring during the manufacture or assemblage.

The annular elastic strip 3 is made of a rubber material or a synthetic resin and is formed integrally with a side lip 3a held in sliding contact with the radial upright wall 1a of the first sealing plate 1 and two radial lips 3b and 3c held in sliding contact with the cylindrical wall 1b of the first sealing plate 1. The side lip 3a extends radially outwardly and diagonally upwardly from a portion of the radial upright wall 2a of the second sealing plate 2 adjacent a radial inner end thereof in a direction so as to slidingly contact the radial upright wall 1a of the first sealing plate 1. The two radial lips 3b and 3c extend axially inwardly and outwardly from that portion of the radial upright wall 2a of the second sealing plate 2 adjacent a radial inner end thereof so as to incline downwardly to slidingly contact the outer peripheral surface of the cylindrical wall 1b of the first sealing plate 1.

This annular elastic strip 3 is disposed so as to cover an entire inside surface of the second sealing plate 2 of the L-shaped section and is also formed integrally with an upturn portion 3d that is turned backwards an axial end 2ba of the cylindrical wall 2b of the second sealing plate 2 adjacent the radial upright wall 1a so as to terminate on an outer peripheral surface of the cylindrical wall 2b. This axial end 2ba of the cylindrical wall 2b is somewhat radially inwardly pressed so that the upturn portion 3d of the annular elastic strip 3 can have an outer peripheral surface of a diameter slightly greater than the outer diameter of the cylindrical wall 2b of the second sealing plate 2, while having a wall thickness of the upturn portion 3d sufficient to allow the second sealing plate 2 to be press-fitted into the outer race 12.

The annular elastic strip 3 is firmly connected with the second sealing plate 2 and is, where the annular elastic strip 3 is made of a rubber material, integrated together with the second sealing plate 2 by means of a vulcanization bonding. Both of the first and second sealing plates 1 and 2 are prepared from a metallic plate such as, for example, steel or stainless steel plate. The first sealing plate 1 is preferably made of stainless steel, in which case the second sealing plate 2 may be made of either stainless steel or steel.

The inner and outer races 11 and 12 may be those of a rolling bearing or a housing and a shaft, respectively, of any machine and equipment.

Figure 2:
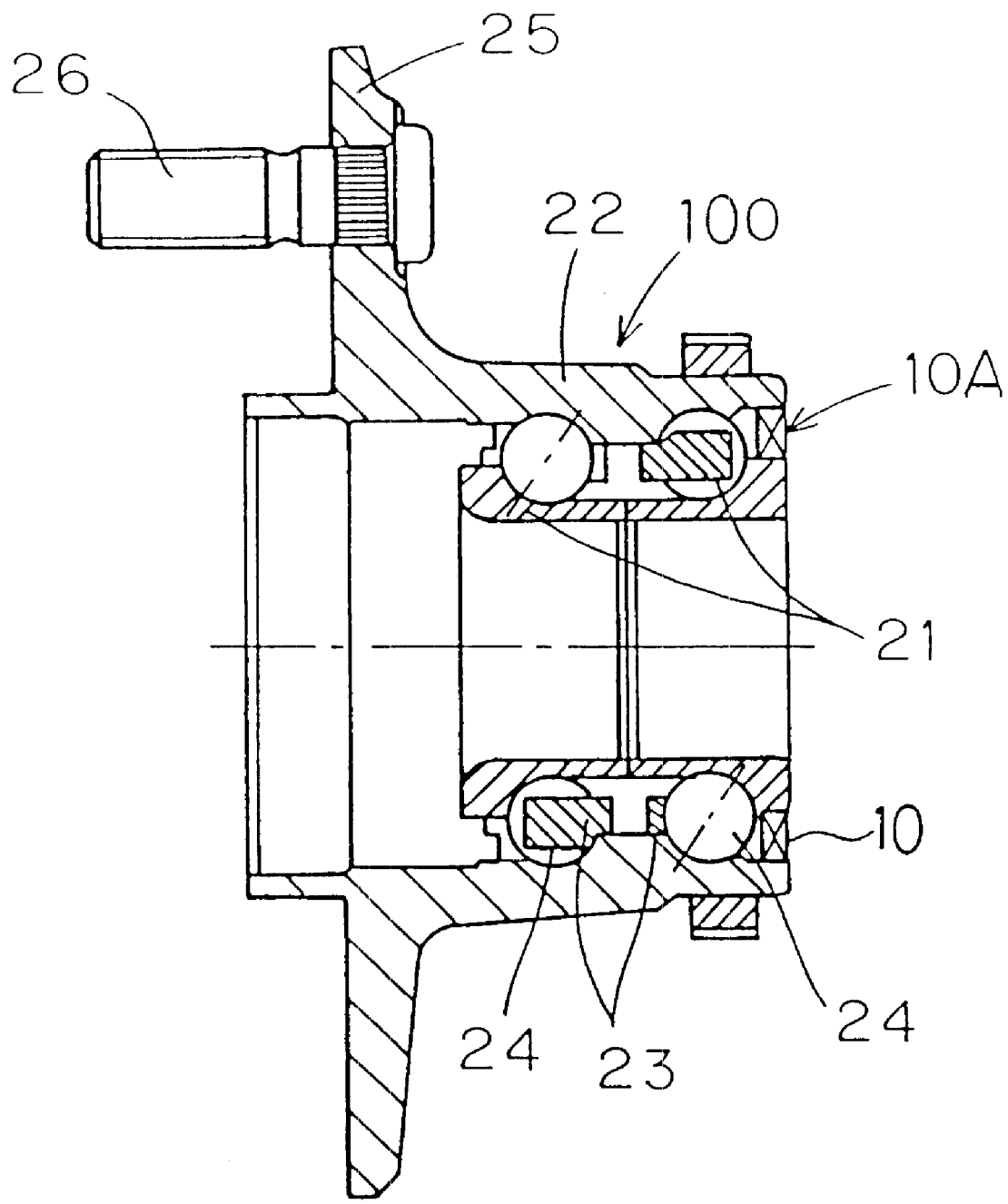
FIG. 2 is a longitudinal sectional view of an axle bearing utilizing the sealing device according to the first preferred embodiment of the present invention.

FIG. 2 illustrates an axle bearing 100, specifically an automobile wheel bearing, utilizing the sealing device 10A according to the foregoing embodiment of the present invention. The axle bearing 100 shown therein comprises a dual ball bearing, more specifically an angular ball bearing of a type employing a split-type inner race and includes inner and outer races 21 and 22 and dual rows of rolling elements 24 and 24 operatively retained by respective retainers 23. The inner races 21 and 21 serves to define a fixed or stationary race and is adapted to be mounted on a non-rotatable axle (not shown). On the other hand, the outer race 22 serves to define a rotatable race and is formed integrally with a hub 25 through which the outer race 22 is connected with a wheel (not shown) by means of hub bolts 26 for rotation together therewith.

The sealing device 10A of the structure shown in and described with reference to FIGS. 1A and 1B is operatively accommodated within an annular space between respective ends of the inner and outer races 21 and 22 of the axle bearing 100 remote from the hub 25.

With the sealing device 10A of the structure shown in and described with reference to FIGS. 1A and 1B, the labyrinth seal 4 is formed in a space between the radial outer end of the radial upright wall 1a of the first sealing plate 1 and the axial end of the cylindrical wall 2b of the second sealing plate 2. This labyrinth seal 4 and the seal lips 3a to 3c slidingly contacting the first sealing plate 1 are effective to provide a seal against ingress of muddy water. According to the embodiment of the present invention, since the outer side surface B of the radial upright wall 1a of the first sealing plate 1 is set back axially inwardly from the plane of the annular end face A of the cylindrical wall 2b of the second sealing plate 2 the distance L which is greater than zero (L>0), the labyrinth seal 4 of a predetermined width as measured in an axial direction can exist at all times between the radial upright wall 1a of the first sealing plate 1 and the cylindrical wall 2b of the second sealing plate 2. For this reason, the sealing performance can be increased. Also, since the sealing device 10A merely requires the radial upright wall 1a of the second sealing plate 1 to be axially inwardly set back relative to the cylindrical wall 2b of the second sealing plate 2, the first and second sealing plates 1 and 2 need not be processed to have a complicated shape and, therefore, the first and second sealing plates 1 and 2 may have a simplified shape. Also, the sealing performance can be increased with no need to increase the space for installation of the sealing device 10A embodying the present invention.

Also, since the second sealing plate 2 is formed with the side lip 3a and the radial lips 3b and 3c, a multiple sealing can be attained in combination with the labyrinth seal 4, thereby enhancing the sealing performance. By way of example, any possible ingress of muddy water from the outside and any possible leakage of bearing grease from the inner space to the outside can be prevented assuredly. Because of the use of the side seal 3a and the radial lips 3b and 3c, the sealing performance can be secured by the seal lips 3a to 3c in any direction even though the first and second sealing plates 1 and 2 may displace relative to each other in an axial direction or a radial direction.

Moreover, since the axial end 2ba of the cylindrical wall 2b of the second sealing plate 2 is covered by the upturn portion 3d of the elastic strip 3 made of, for example, a rubber material, the second sealing plate 2 can be elastically mounted in the outer race 12, thereby facilitating a job of fitting the sealing device 10A. Where the elastic strip 3 is firmly bonded to the second sealing plate by means of a vulcanization process, connection of the elastic strip 3 to the second sealing plate 2 can easily and firmly be accomplished.

Since the first sealing plate 1 is a component part of the sealing device 10A that is exposed to the outside, the use of stainless steel as material for the first sealing plate 1 is effective to avoid any possible rusting of the first sealing plate 1 even when the sealing device 10A is used in an environment where it is susceptible to muddy water.

Although in describing the foregoing embodiment of the present invention the first and second sealing plates 1 and 2 have been described as mounted on and in the inner and outer races 11 and 12, respectively, the reverse may be applicable, that is, the first and second sealing plates 1 and 2 may be mounted in and on the outer and inner races 12 and 11, respectively. In such case, the radial upright wall 1a of the first sealing plate 1 will extend from the cylindrical wall 1b thereof in a direction radially inwardly and the radial upright wall 2a of the second sealing plate 2 will extend from the cylindrical wall 2b thereof in a direction radially outwardly.

Figure 7:
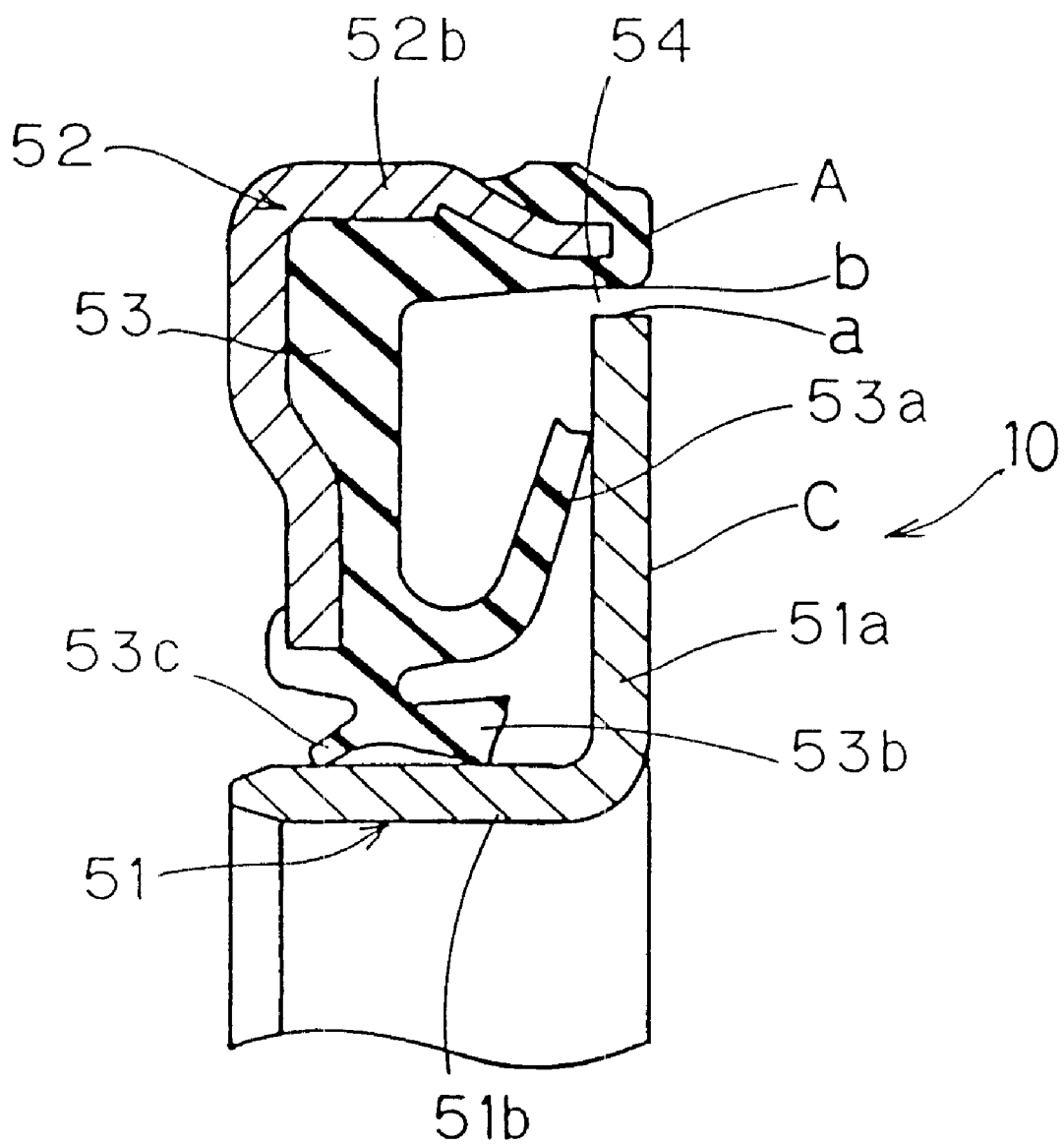
FIG. 7 is a transverse sectional view of one prior art sealing device used in the axle bearing.

The two identical sealing devices 10A (No. 1 and 2) according to the embodiment shown in FIGS. 1A (Inventive Devices) and 1B and the two identical prior art sealing devices 10 (No. 1 and 2) shown in FIG. 7 (Comparative Devices) were tested to determine the sealing performance against ingress of muddy water. Test results are tabulated in Table 1 below.

The comparative devices tested were of the structure wherein the outer side surface C of the first sealing plate 51 shown in FIG. 7 protrudes a quantity of 0.2 mm from the annular end face A of the second sealing plate 52, whereas the inventive devices tested were of the structure wherein the quantity of such protrusion is zero, or the distance L in FIG. 1A equals to zero which is a condition falling on the border line of the present invention. The test was carried out by immersing all of those sealing devices in a bath containing muddy water, within which the sealing devices were repeatedly run and halted a number of cycles each consisting of running at a constant speed for a predetermined time and halting for a predetermined time, to determine the total length of time the devices could run until the muddy water ingressed.

Although the number of revolutions and the proportion of the run time and the halt time for each cycle slightly differ between the inventive sealing devices and the comparative sealing devices, Table 1 below shows that the total length of time the inventive devices could run until the muddy water ingressed are longer than those exhibited by the comparative sealing devices and, hence, the sealing devices of the present invention have exhibited a sealing performance that is superior to the prior art sealing devices.

TABLE 1

Summary of Results of Evaluation

| | | Test No. 1 | | Test No. 2 | |
|---|---|---|---|---|---|
| | Quantity of Protrusion | Cycle Nos. | Run Time | Cycle Nos. | Run Time |
| Comp. Devices (1000 rpm) | 0.2 mm | 14 | 224 hr. | 15 | 240 hr. |
| Inven. Devices (1100 rpm) | 0 mm | 16 | 320 hr. | 17 | 340 hr. |

Figure 3:
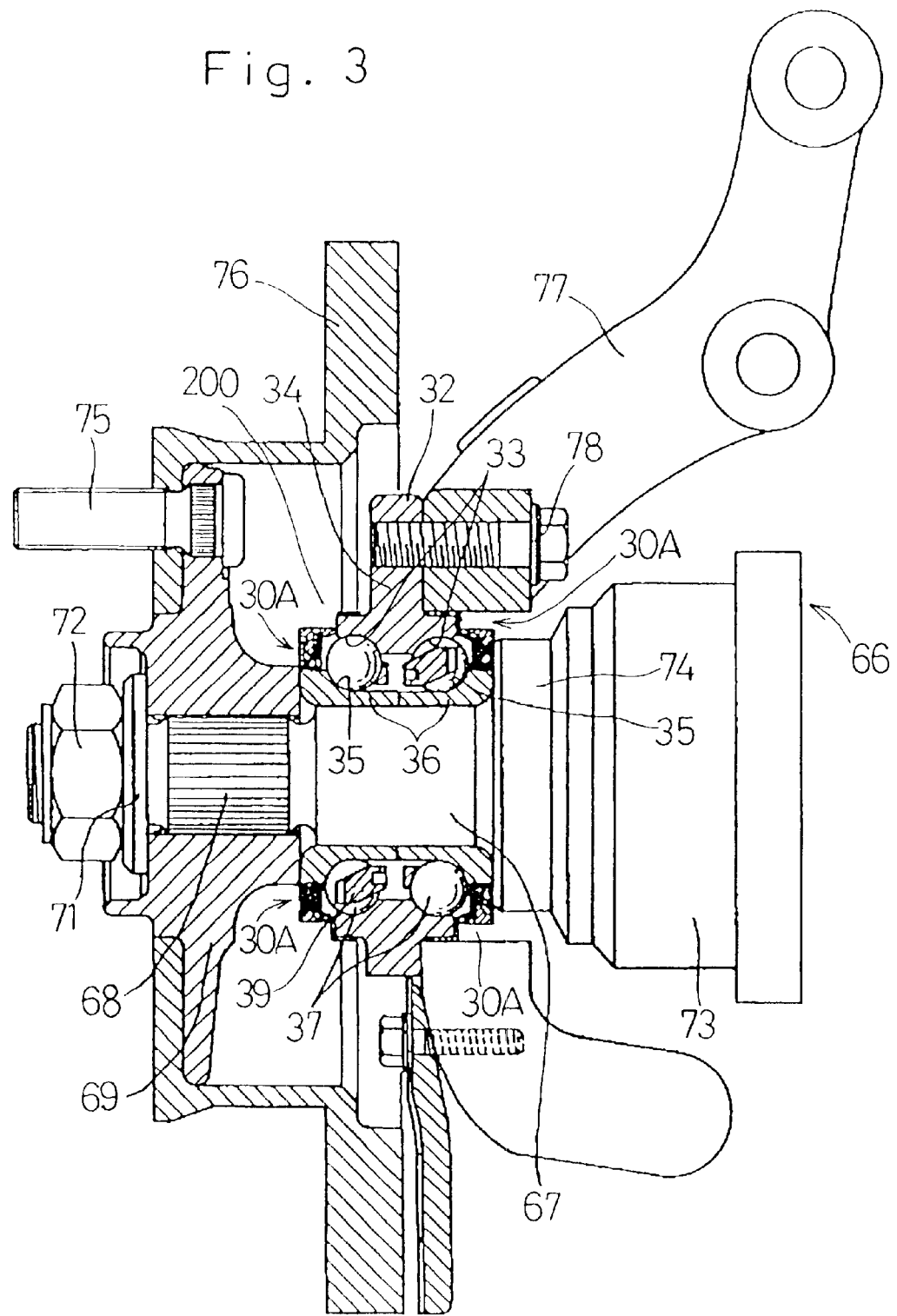
FIG. 3 is a longitudinal sectional view, showing the sealing device according to a second preferred embodiment of the present invention in a condition of use.
Figure 4A:
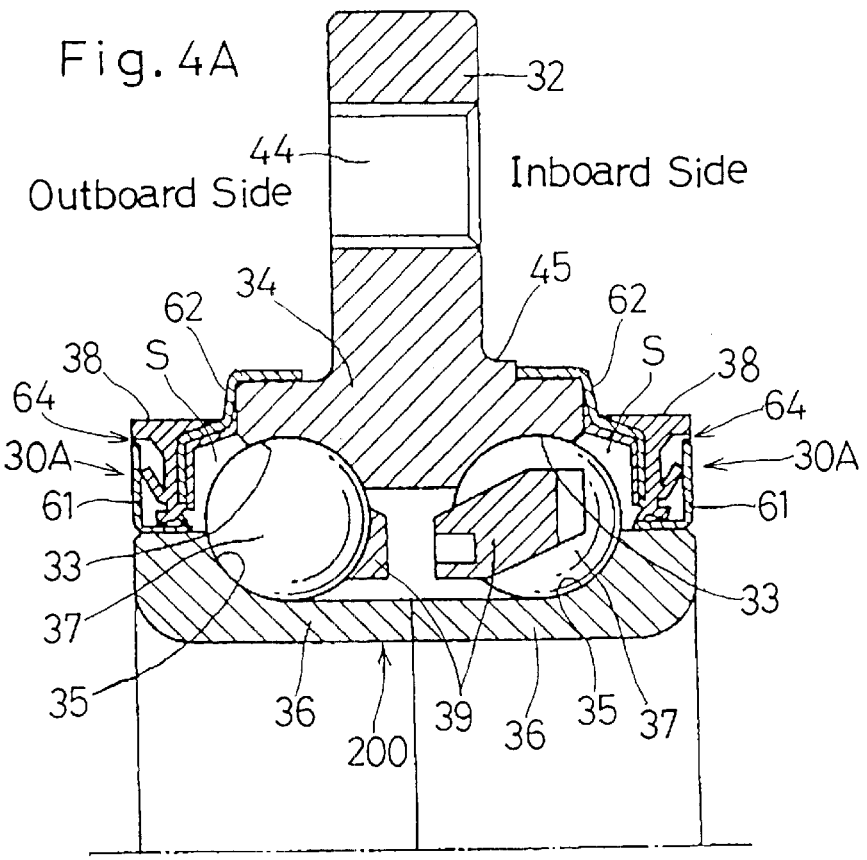
FIG. 4A is a longitudinal sectional view, on an enlarged scale, of a portion of the sealing device shown in FIG. 3.
Figure 4B:
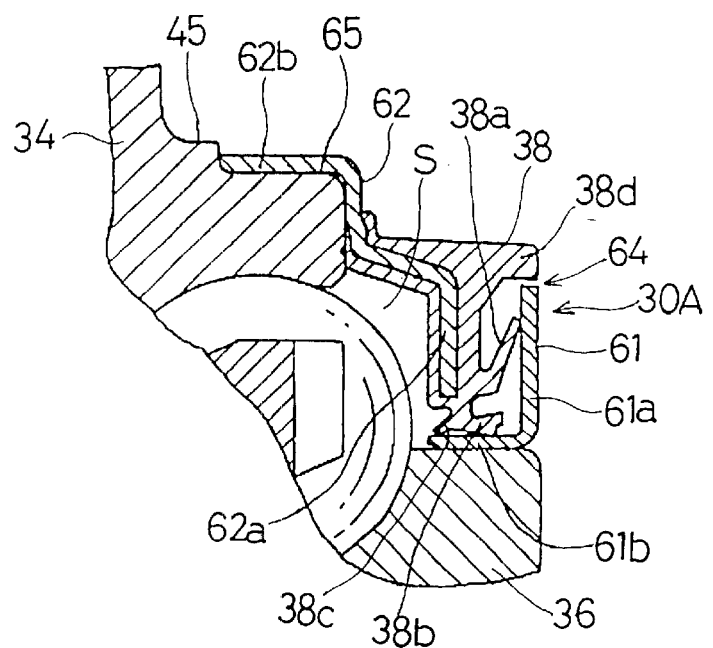
FIG. 4B is a fragmentary longitudinal sectional view, on a further enlarged scale, showing a portion of the sealing device shown in FIG. 3.
Figure 9:
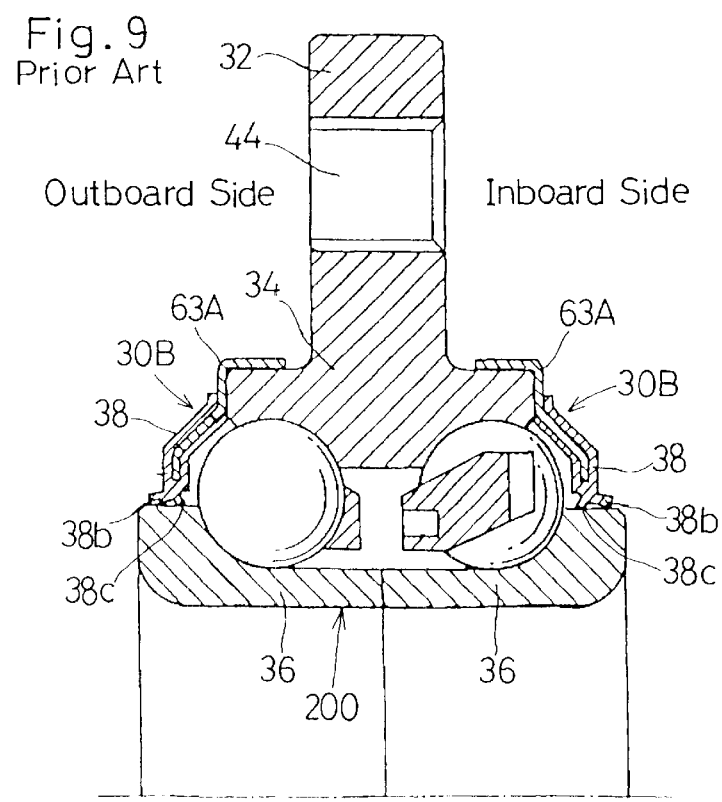
FIG. 9 is a longitudinal sectional view of a portion of a further prior art sealing device used in the axle bearing.

Referring now to FIGS. 3, 4A and 4B, the sealing devices 30A and 30A according to a second preferred embodiment of the present invention will be described. FIG. 3 illustrates an axle bearing 200 in a condition of use. This axle bearing 200 has a basic structure substantially similar to that of the prior art axle bearing shown in and described with reference to FIG. 9 and includes a stationary outer race 34 having an outer peripheral surface formed integrally with a radial flange 32 through which the axle bearing 200 is fitted to an automobile body structure, and also having an inner peripheral surface formed with dual raceways 33 and 33; a rotatable inner race assembly having an outer peripheral surface formed with inner races 36 and 36 having respective raceways 35 and 35 defined therein in face-to-face relation with the dual raceways 33 and 33 in the outer race 34; respective rows of rolling elements 37 and 37 rollingly accommodated between the raceways 33 and 33 in the outer race 34 and the raceways 35 and 35 in the inner races 36 and 36; and sealing devices 30A and 30A for sealing an annular space S delimited between the outer race 34 and the outboard and inboard inner races 36 and 36. Each row of the rolling elements 37 are spaced an equal distance from each other in a circumferential direction thereof and are retained by a respective retainer 39.

As shown in FIG. 4A, the width of the outer race 34 as measured in a direction axially of the axle bearing 200 is chosen to be smaller than the sum of the respective widths of the two inner races 36 and 36 as measured in a direction axially thereof, and the inner and outer races are so combined together with axially opposite end faces of the outer race 34 positioned having been set back inwardly from the respective adjacent end faces of the inner races 36 and 36. The outer race 34 has an outer peripheral surface formed integrally with a knuckle engagement 45 positioned radially inwardly of the radial flange 32 of the outer race 34.

A first sealing plate 61 is mounted on an outer peripheral surface of one end of each of the inner races 36 remote from the other inner race 36. This first sealing plate 61 is of a generally L-shaped section including, as shown in FIG. 4B, a cylindrical wall 61b and a collar-shaped radial upright wall 61a formed integrally with one end of the cylindrical wall 61b so as to extend radially outwardly therefrom and is made of, for example, stainless steel.

Each of the sealing device 30A also includes a second sealing plate 62 and a flexible seal lip member 38 connected integrally with the second sealing plate 62. This second sealing plate 62 is of a generally L-shaped section including a cylindrical mount 62b and an upright wall 62a of a generally inverted L-shaped section that is continued from the cylindrical mount 62b so as to gently bend in a direction radially inwardly, with the seal lip member 38 joined to such upright wall 62a.

The seal lip member 38 is of a shape having an inner peripheral end formed integrally with bifurcated radial lips 38b and 38c and also formed with a radially outwardly inclined side lip 38a. The side lip 38a is in turn formed with a bulged portion 38d protruding axially outwardly from an outer side of the side lip 38a.

The cylindrical mount 62b of the second sealing plate 62 is mounted on a reduced-diameter shoulder 65 formed in a portion of the knuckle engagement 45 integral with the outer race 34. This cylindrical mount 62b of the second sealing plate 62 is entombed radially inwardly from the knuckle engagement 45 for the purpose of enhancing an alignment with the knuckle 77.

The radial lips 38b and 38c of the seal lip member 38 are held in contact with the cylindrical wall 61b of the first sealing plate 61. The side lip 38a thereof is held in contact with the upright wall 61a of the first sealing plate 61, and a labyrinth seal 64 is defined between the bulged portion 38d and the upright wall 61a of the first sealing plate 61.

The structure other than that described hereinabove is substantially similar to that described in connection with the prior art and is therefore not reiterated for the sake of brevity.

With the axle bearing 200 of the structure described above, the inner races 36 and 36 are mounted directly on an outer race stem 67 of an constant velocity joint 66 and a hub wheel 69 for supporting a wheel is mounted on a serrated shaft portion 68 integral with a rear end of the outer race stem 67. Also, when a nut 72 is fastened to a rear end of the serrated shaft portion 68 through a washer 71, the constant velocity joint 66, the axle bearing 200 and the hub wheel 69 are fixed together. In this way, the inner races 36 and 36 of the axle bearing 200 are sandwiched between a shoulder 74 of a joint outer race 73 of the constant velocity joint 66 and the hub wheel 69. Wheel fixing bolts 75 are then fastened to the hub wheel 69, followed by mounting of a boss portion of a brake rotor 76 on the hub wheel 69 that is then fixed in position by bolts 75. Also, a knuckle 77 is engaged with the knuckle engagement 45 on the outer race 34 and fixed thereto by bolts 78.

As can readily be seen from FIG. 4B, with the axle bearing 200 according to the second embodiment of the present invention, surface areas of the cylindrical wall 61b and the upright wall 61a of the first sealing plate 61, with which the radial lips 38b and 38c and the side lip 38a of the seal lip member 38 are held in sliding contact, are protected by the labyrinth seal 64 to avoid ingress of muddy water and dusts. Consequently, those sliding surface areas are less susceptible to rusting, resulting in increase of the sealing performance. Also, since the first sealing plate 61 is made of stainless steel, any possible rusting of the sliding surface areas can be effectively prevented advantageously.

A third preferred embodiment of the present invention will now be described with reference to FIG. 5.

Figure 5:
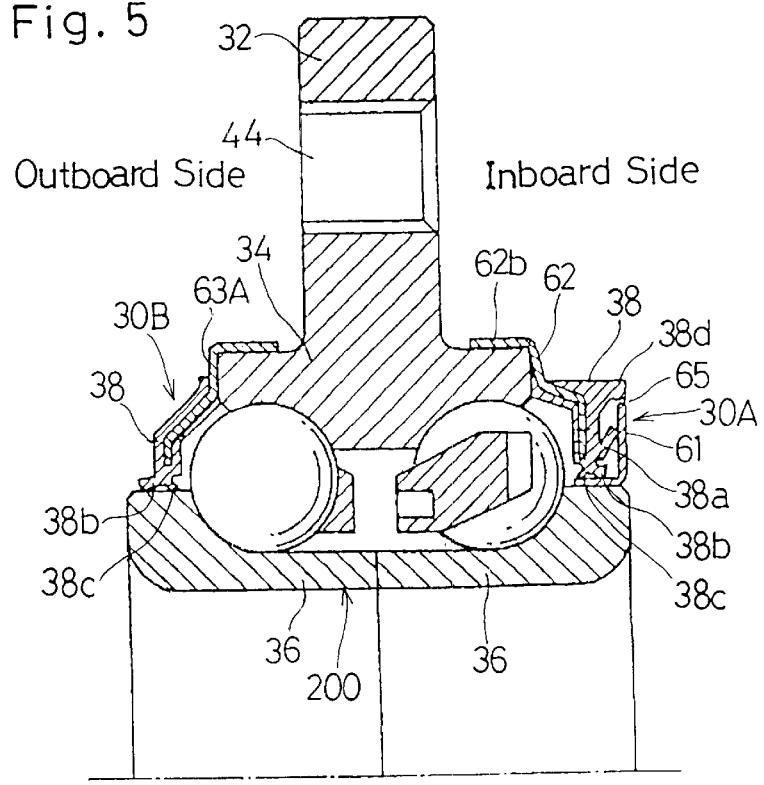
FIG. 5 is a view similar to FIG. 4A, showing the sealing device according to a third preferred embodiment of the present invention.
Figure 8:
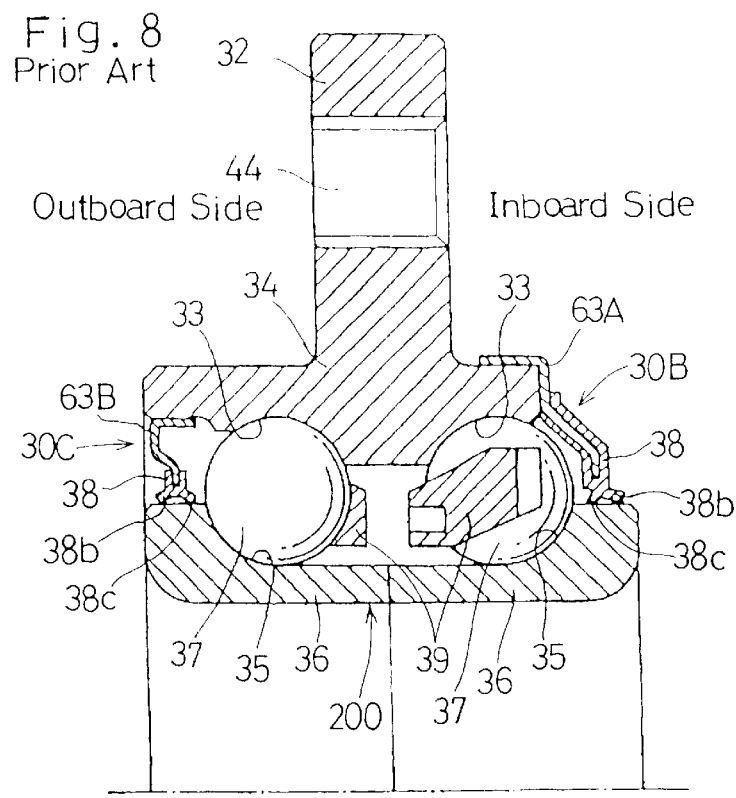
FIG. 8 is a longitudinal sectional view of a portion of another prior art sealing device used in the axle bearing.

While in the foregoing second embodiment of the present invention, the first sealing plate 61 of the sealing device 30A has been used on the respective outer peripheral surfaces of the neighboring ends of the inner races 36 and 36, the third embodiment of the present invention is such that, as shown in FIG. 5, the first sealing plate 61 of the sealing device 30A is mounted on an outer peripheral surface of the end of one of the inner races 36 that is positioned on an inboard side whereas on an outboard side the radial lips 38b and 38c of the seal lip member 38 of the sealing plate 63A of the sealing device 30B having no first sealing plate shown in FIG. 8 are brought into direct contact with an outer peripheral surface of the end of the other of the inner races 36.

Figure 6:
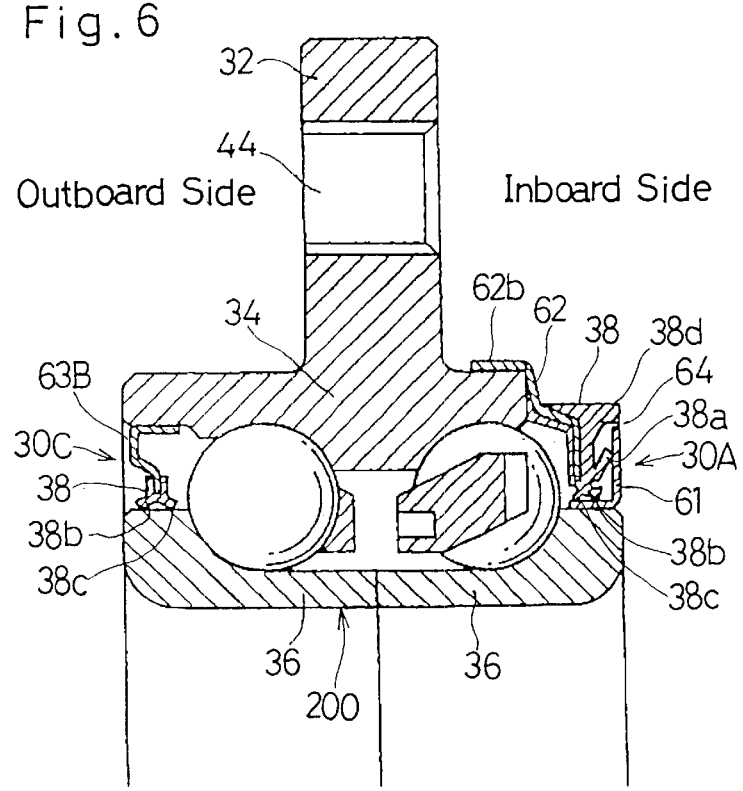
FIG. 6 is a view similar to FIG. 4A, showing the sealing device according to a fourth preferred embodiment of the present invention.

A fourth preferred embodiment of the present invention is shown in FIG. 6. Referring to FIG. 6, an inboard-side width of the outer race 34 in the axial direction is chosen to be small while an outboard-side end face of the outer race 34 is held in flush with an outboard-side end face of the inner race 36 on the outboard side. In such case, on the inboard side, the sealing device 30A employing the first sealing plate 61 is employed as is the case with FIGS. 4A and 4B and FIG. 5. The sealing device 30C on the outboard side may be substantially identical with the conventional one shown in FIG. 8.

Although the present invention has been fully described in connection with the preferred embodiments thereof with reference to the accompanying drawings, which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sealing device for use with an axle bearing comprising an outer race having a fitting flange connectable to an automobile body and also having an inner peripheral surface formed with dual outer raceways defined therein, first and second inner races juxtaposed to each other and each having an outer peripheral surface formed with an inner raceway in face-to-face relation to a corresponding one of the outer raceways, and two rows of rolling elements, the rolling elements of each row being accommodated in between one of the outer raceways of the outer race and the inner raceway of one of the inner races, said outer race having a width as measured in a direction axially thereof which is smaller than the sum of the respective width of the inner races as measured in a direction axially thereof, and at least an inboard-side end face of the outer race being positioned at a location set back inwardly towards an annular space, which is delimited between the outer race and the juxtaposed inner races, from an end face of one of the inner races, the sealing device for sealing the annular space at each of opposite ends of the annular space, which sealing device comprises:

a first sealing plate of a generally L-shaped section mounted on an outer peripheral surface of at least one of the juxtaposed inner races and positioned at a location adjacent one end of the one of the inner races and having a radial upright wall formed therein;

a second sealing plate mounted in an outer peripheral surface of the outer race and positioned at a location adjacent the first sealing plate and including an elastic seal lip member fixed to the second sealing plate, said elastic seal lip member being held in sliding engagement with the first sealing plate, said elastic seal lip member having a bulged portion formed therewith and positioned spaced a slight distance radially from the upright wall of the first sealing plate to define a labyrinth seal between the bulged portion and the first sealing plate, wherein the elastic seal tip member includes bifurcated radial tips slidingly engaged with a cylindrical wall of the first sealing plate and a side lip extending slantwise radially outwardly from the elastic seal member and slidingly engaged with the radial upright wall of the first sealing plate.

2. A sealing device for use with an axle bearing comprising an outer race having a fitting flange connectable to an automobile body and also having an inner peripheral surface formed with dual outer raceways defined therein, first and second inner races juxtaposed to each other and each having an outer peripheral surface formed with an inner raceway in face-to-face relation to a corresponding one of the outer raceways, and two rows of rolling elements, the rolling elements of each row being accommodated in between one of the outer raceways of the outer race and the inner raceway of one of the inner races, said outer race having a width as measured in a direction axially thereof which is smaller than the sum of the respective width of the inner races as measured in a direction axially thereof, and at least an inboard-side end face of the outer race being positioned at a location set back inwardly towards an annular space, which is delimited between the outer race and the juxtaposed inner races, from an end face of one of the inner races, the sealing device for sealing the annular space at each of opposite ends of the annular space, which sealing device comprises:

a first sealing plate of a generally L-shaped section mounted on an outer peripheral surface of at least one of the juxtaposed inner races and positioned at a location adjacent one end of the one of the inner races and having a radial upright wall formed therein;

a second sealing plate mounted in an outer peripheral surface of the outer race and positioned at a location adjacent the first sealing plate and including an elastic seal lip member fixed to the second sealing plate, said elastic seal lip member being held in sliding engagement with the first sealing plate, said elastic seal lip member having a bulged portion formed therewith and positioned spaced a slight distance radially from the upright wall of the first sealing plate to define a labyrinth seal between the bulged portion and the first sealing plate, wherein the outer race has an outer peripheral surface formed with a knuckle engagement having a generally intermediate portion formed with a knuckle engagement, said knuckle engagement having a generally intermediate portion formed with a reduced-diameter step and wherein the second sealing plate is mounted on the reduced-diameter step of the knuckle engagement.

3. The sealing device as claimed in claim 2, wherein the first sealing plate is mounted on at least an inboard-side outer peripheral surface of the at least one juxtaposed inner races and the elastic seal lip member of the sealing device on an inboard side of the outer race is held in sliding contact with such first sealing plate.

4. The sealing device as claimed in claim 2, wherein the elastic seal lip member includes bifurcated radial lips slidingly engaged with a cylindrical wall of the first sealing plate and a side lip extending slantwise radially outwardly from the elastic seal lip member and slidingly engaged with the radial upright wall of the first sealing plate.

5. The sealing device as claimed in claim 2, wherein the juxtaposed inner races are mounted directly on an outer race stem portion of a constant velocity joint and wherein the juxtaposed inner races are sandwiched and positioned in between a hub wheel for support of a wheel and a shoulder of a joint outer race of the constant velocity joint.

* * * * *